Oct. 24, 1950     L. BERKOWER     2,527,348
ADJUSTABLE MEASURING CUP
Filed Dec. 23, 1947
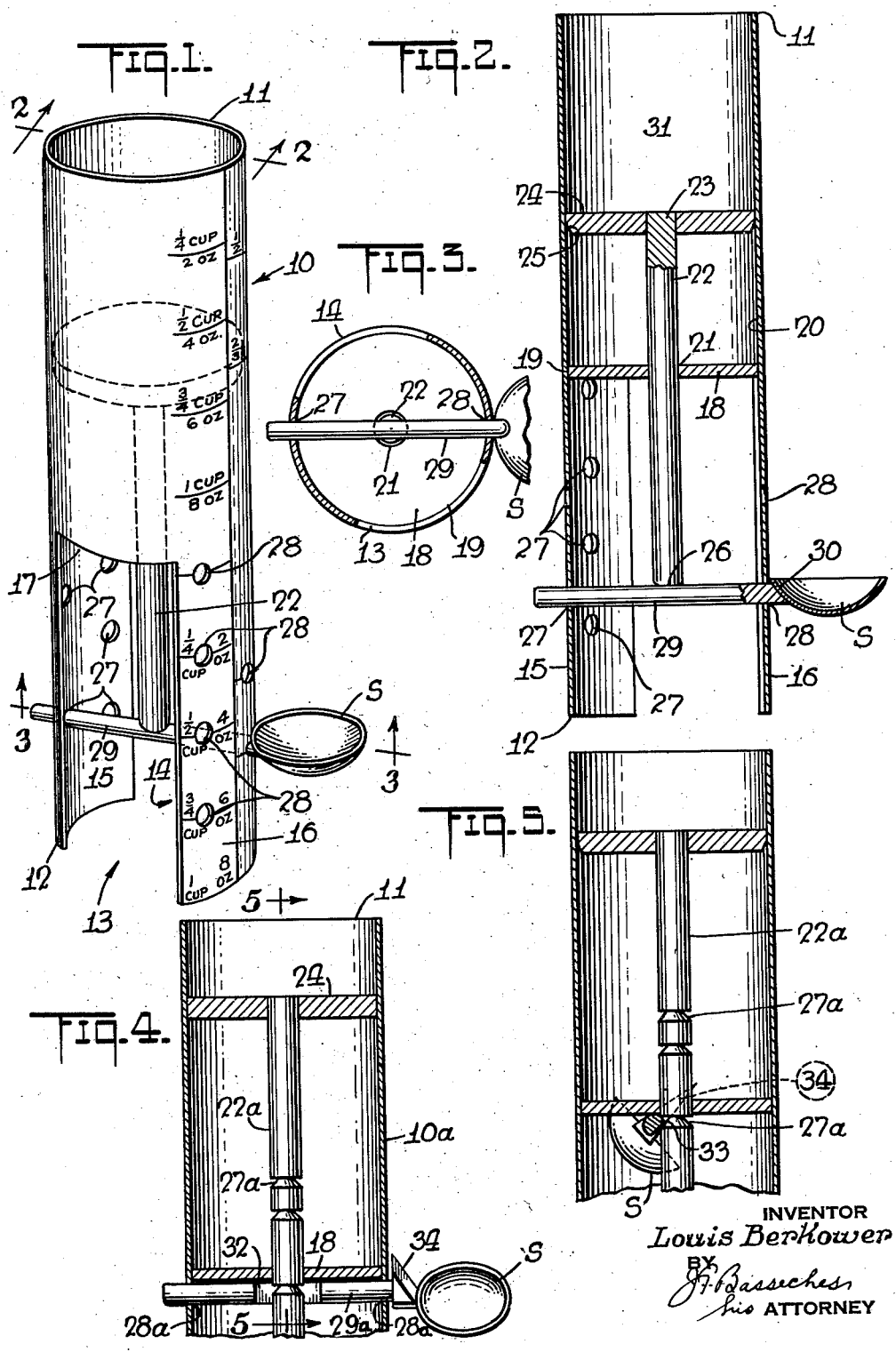
INVENTOR
*Louis Berkower*
BY
*J. F. Basseches*
*his* ATTORNEY Patented Oct. 24, 1950

2,527,348

UNITED STATES PATENT OFFICE 2,527,348

ADJUSTABLE MEASURING CUP

Louis Berkower, Bronx, N. Y.

Application December 23, 1947, Serial No. 793,420

2 Claims. (Cl. 73—429)

This invention relates to food measuring devices; more particularly to adjustable food measuring devices.

It is an object of my invention to provide an adjustable measuring cup especially adaptable for measuring food so that dry, liquid or pasty material such as butter, may be measured as part of a cooking or baking operation, with the same cup body, which permits of quick handling characterized by simplicity of working parts which may be readily cleansed.

It is contemplated by my invention to provide an adjustable measuring cup having a body portion and an open top, with an adjustable bottom member so that the measuring operation may be made with regard to the rim of the cup, to permit the use of the edge for determining the full measure, and permitting levelling off of the components to be measured with regard to the rim, while supporting the cup upon a level surface, such as a table top.

It is still further contemplated as an object of my invention to provide an adjustable measuring cup having an adjustable bottom member, with the body of the cup braced upon supporting members which cooperate with the movable bottom to outline the capacity of the cup with regard to the rim, whereby shortening as well as pulverulent and liquid material may be measured, using the rim of the cup as the levelling edge.

Still more particularly, it is an object of my invention to provide an adjustable measuring cup having a body portion which may be supported on a level surface, such as a table top, and an adjustable bottom which is movable with regard to the rim of the cup, characterized by the employment of a body portion of simple contour and made of transparent material so that assembly may be effected by simple machining operations and the body of the cup is visible therethrough to ascertain the contents which are measured, and still further to permit separation of the movable parts, to maintain a high order of cleanliness.

Still more particularly, it is contemplated by my invention to provide a measuring cup which lends itself readily to economical production by simple machining operations, making commercially feasible the employment of metal substitutes, such as plastic compositions, whereby a low cost yet efficient article may be produced.

To attain these objects and such further objects as may appear herein, or be hereinafter pointed out, I make reference to the accompanying drawing forming a part hereof, in which—

Figure 1 is a perspective view of my device;

Figure 2 is a section taken on the line 2—2 of Figure 1;

Figure 3 is a section taken on the line 3—3 of Figure 1;

Figure 4 is a longitudinal, fragmentary, sectional view of another embodiment of my invention;

Figure 5 is a similar view, to illustrate the bottom locking mechanism.

Making reference to the drawing, it is contemplated by my invention to provide a measuring cup 10 which may be formed of sheet material, such as sheeted and plasticized cellulose acetate, polymerized vinyl resin compounds, phenol formaldehyde condensation resins, whether rolled from sheets, cast or extruded, to provide a tubular body of uniform diameter. The upper edge 11 of the tube thereof may be squared off to the axial line. The lower edge 12 is likewise cut off square, and is then formed with cut out sections 13 and 14 at diametrically opposite portions of the tubular body, to outline the supporting legs or members 15 and 16. The residual portion of the tubular body defines legs or supporting members of arcuate cross section terminating in the transverse edge 17 at about the mid point of the tubular body. Adjacent this edge, I then provide a partition disk 18 by cementing its peripheral edge 19 to the interior 20 of the tubular body. Where other materials are used than the plastics appropriate means are employed to seal the disk in position. The disk 18 is formed with an axial aperture 21, through which is directed a shape conforming rod 22 which carries at the upper end 23 a bottom member 24, whose peripheral edge 25 may be beveled or tapered down slightly in the direction of the disk 18. The disk 24 and the rod 22 provide an adjustable bottom member for the tubular body spaced from the rim 11 to the limiting position when the adjustable bottom 24 contacts the disk 18. The disk 18, with its aperture 21, provides a guide for the rod 22 as well as to serve as a secondary air seal for the bottom 24.

The lower end 26 of the rod 22 extends axially into the space outlined by the supporting members 15 and 16. The rod 22 is of a length to be able to adjust the bottom to just above the rim 11 in one direction, and above the supporting edge 12 in the opposite direction, when the bottom is slid to the limiting position resting upon the partition disk 18, the legs 15 and 16 being extended for a distance greater than the space between the partition disk 18 and the length of the supporting rod 22.

The legs 15 and 16 are provided with a series of diametrically opposed apertures or stops 27 and 28, to receive the rod or shank 29 of a spoon 30 passing through the axial line of the tubular element. The shank 29 thereupon provides a support for the end 26 of the rod 22, which is axially guided by the partition disk 18. The diametrically paired apertures or stops 27 and 28 need not be aligned along the legs but may be staggered and arranged along the legs 15 and 16 so as to predeterminedly position the bottom supported upon the rod 22, to measure off within the cup portion 31 any predetermined volume from, for example, a full cup when the bottom 24 is in the bottom limiting position resting upon the partition 18, through variables covering the fractions thereof, to a rim sealing position when the uppermost apertures or stops 27, 28 are employed to hold the cross bar or shank 29 for supporting the end 26 of the rod 22.

It will be observed from this construction that various products may be measured by adjusting the adjustable bottom. By reason of the provision of the supporting legs 15 and 16, the entire contrivance may be held level upon a table top or the like to pack into the cup portion 31, the desired material, whether in a dry state such as flour, cereal, crumbs, nuts, or in a pasty state material, such as butter, lard, margarine, or in a liquid condition, such as milk, eggs, oil. The relationship of the air seal and the piston adapts the device to the measuring of a wide variety of material, without requiring machining operations, or the necessity for providing packing between the movable parts.

Access through the cutouts 13 and 14 permits ready adjustment of the adjustable bottom member. This, coupled with the extensiveness of the supporting members 15 and 16 and the diametrically positioned stop holes 27 and 28, allow for the fractionating of adjustment of the adjustable bottom within a wide range, without sacrificing rigidity of support, to permit packing of the plastic food component, such as the shortening into the cup portion 31.

The employment of transparent material as for the body of the device previously described makes it possible to observe the position of the materials to be measured within the cup body 31, and the employment of organic plastic make possible operation without the necessity of employing a gland packing between the slidable or movable parts.

In Figures 4 and 5 there is illustrated another embodiment which employs a continuous tube 10a for the body of the measuring cup formed with a pair of spaced supporting members, as in the prior embodiment. In this construction, however, the adjustable bottom 24 is formed with a supporting rod 22a to pass through a partition disk 18, as in the prior embodiment. The supporting rod 22a is formed with annular notches 27a, each of which is located along the length of the supporting rod 22a to position the movable bottom 24 from the rim 11 a predetermined distance, and outline volumetrically some unit or fraction of a unit of measure. In this embodiment, the supporting members 15 and 16 are provided with guiding apertures 28a, located off-center or chordally to revolubly receive the stop rod 29a, which may be the shank of a measuring spoon. In the embodiment, the shank 29a is formed with a clearance slot 32, whereby the movement of the rod 22a in the axial position is possible when the clearance slot 32 is adjusted in parallelism.

Upon alignment of any one of the notches 27a in a predetermined position adjacent the partition disk, rotation of the shank 29a will serve to move an edge 33 into engagement with a notch 27a, holding the rod 22a against downward vertical sliding movement. In this manner, only one single pair of bearing apertures 28a need be provided to act as bearings for the notched rod 22a, to adjustably hold the bottom of the cup in position.

In the embodiment illustrated, the cross rod 29 or 29a may be the shank of a spoon S, which provides a convenient measuring appliance as well as forming a turn knob for adjusting the cross bar revolubly in position. Additionally, in the embodiment illustrated in Figures 4 and 5, the spoon S may be provided with a pointer 34, which is positioned at right angles to the slot 32 and may be used to show the locking position or open position of the shank 29a, and thereby indicate whether the bottom member is in the locked or slidable position.

While I have described and illustrated a cylindrical housing or body portion for the cup, it will be understood that the tubular housing may have different contours and I may use a tubing whose cross-section is rectangular, in which event the movable bottom 24 is similarly contoured.

In general, it will be observed that I have provided an adjustable measuring cup in which the bottom member may be supported upon a supporting surface, such as a table top, thereby to permit levelling off of the material to be measured with respect to the rim of the cup. It will further be observed that I have provided a construction which is simple to manufacture and which may be readily cleaned by reason of the simplicity of construction of the movable parts.

Having thus described my invention and illustrated its use, what I claim as new and desire to secure by Letters Patent is:

1. An adjustable measuring cup comprising a preformed tubular body of sheeting defining a cylindrical cup, cutouts outlining supporting legs, a disk dividing said supporting legs and cup, an adjustable bottom member slidable in said cup portion and having a guide rod extending through said disk, diametrically arranged stop apertures on said supporting legs and a rod selectably supported in said stop apertures engaging said guide rod, to hold said guide rod and adjustable bottom in predetermined positions in said cup portion.

2. An adjustable measuring cup comprising a preformed tubular body of sheeting defining a cylindrical cup, cutouts outlining supporting legs, a disk dividing said supporting legs and cup, an adjustable bottom member slidable in said cup portion and having a guide rod extending through said disk, diametrically arranged stop apertures arranged longitudinally in groups on said supporting legs and a rod selectably supported in said stop apertures engaging said guide rod, to hold said guide rod and adjustable bottom in predetermined positions in said cup portion.

LOUIS BERKOWER.

REFERENCES CITED

The following references are of record in the file of this patent:

UNITED STATES PATENTS

| Number | Name | Date |
| --- | --- | --- |
| 138,281 | Pflock | Apr. 29, 1873 |
| 713,688 | Sansone | Nov. 18, 1902 |
| 968,940 | Harmison | Aug. 30, 1910 |
| 1,602,937 | Rieff | Oct. 12, 1926 |
| 2,163,364 | Ouellette | June 20, 1939 |
| 2,328,995 | Olds | Sept. 7, 1943 |